United States Patent
Ito et al.

(10) Patent No.: US 11,952,711 B2
(45) Date of Patent: Apr. 9, 2024

(54) SEWING THREAD TREATMENT AGENT AND SEWING THREAD

(71) Applicant: TAKEMOTO YUSHI KABUSHIKI KAISHA, Gamagori (JP)

(72) Inventors: Jun Ito, Gamagori (JP); Hisanori Murata, Gamagori (JP); Shuya Hayakawa, Gamagori (JP)

(73) Assignee: TAKEMOTO YUSHI KABUSHIKI KAISHA, Gamagori (JP)

(*) Notice: Subject to any disclaimer, the term of this patent is extended or adjusted under 35 U.S.C. 154(b) by 394 days.

(21) Appl. No.: 17/414,854

(22) PCT Filed: Mar. 10, 2021

(86) PCT No.: PCT/JP2021/009447
§ 371 (c)(1),
(2) Date: Jun. 16, 2021

(87) PCT Pub. No.: WO2021/235051
PCT Pub. Date: Nov. 25, 2021

(65) Prior Publication Data
US 2022/0170202 A1  Jun. 2, 2022

(30) Foreign Application Priority Data

May 19, 2020 (JP) ................................ 2020-087164

(51) Int. Cl.
*D06M 15/643* (2006.01)
*C09D 7/45* (2018.01)
*C09D 183/06* (2006.01)
*C09D 191/08* (2006.01)
*D06M 13/02* (2006.01)

(52) U.S. Cl.
CPC ............ *D06M 15/643* (2013.01); *C09D 7/45* (2018.01); *C09D 183/06* (2013.01); *C09D 191/08* (2013.01); *D06M 13/02* (2013.01)

(58) Field of Classification Search
CPC ...... D06M 13/02; D06M 15/643; C09D 7/45; C09D 183/06; C09D 191/08
See application file for complete search history.

(56) References Cited

U.S. PATENT DOCUMENTS

| 4,583,987 A | 4/1986 | Kurz |
| 2004/0200006 A1 | 10/2004 | Sandner et al. |
| 2019/0359869 A1* | 11/2019 | Kotake .................. C08L 83/04 |

FOREIGN PATENT DOCUMENTS

| JP | H02307980 A | 12/1990 |
| JP | H08302573 A | 11/1996 |
| JP | 2011111705 A | 6/2011 |
| JP | 2017110312 A | 6/2017 |
| WO | WO-2008047474 A1 * | 4/2008 ............ D06M 13/02 |

OTHER PUBLICATIONS

English translation of WO-2008047474-A1 to Kando et al. obtained from PE2E database. (Year: 2008).*
International Search Report (ISR) dated May 18, 2021, issued for International application No. PCT/JP2021/009447. (3 pages) (no translation is available).
International Search Report (ISR) dated May 18, 2021, issued for International application No. PCT/JP2021/009447. (2 pages) (Translation).

* cited by examiner

*Primary Examiner* — Jeremy R Pierce
(74) *Attorney, Agent, or Firm* — Law Office of Katsuhiro Arai

(57) ABSTRACT

An object of the present invention is to provide a sewing thread treatment agent, and a sewing thread, each achieving low friction properties across a wide range of sewing speeds. As a solution, a sewing thread treatment agent is provided, which is characterized in that it contains a hydroxy-terminated polydimethylsiloxane (A), a nonionic surfactant (B), and at least one type of wax (C) selected from paraffin wax, oxidized paraffin wax, polyethylene wax, oxidized polyethylene wax, and carnauba wax.

4 Claims, No Drawings

SEWING THREAD TREATMENT AGENT AND SEWING THREAD

CROSS-REFERENCE TO RELATED APPLICATIONS

This application is the U.S. National Phase under 35 U.S.C. § 371 of International Application PCT/JP2021/009447, filed Mar. 10, 2021, which claims priority to Japanese Patent Application No. JP2020-087164, filed May 19, 2020. The International Application was published under PCT Article 21(2) in a language other than English.

TECHNICAL FIELD

The present invention relates to a sewing thread treatment agent, and a sewing thread, each achieving low friction properties across a wide range of speeds.

BACKGROUND ART

While natural fibers, primarily cotton fibers, were used for sewing threads in ancient times, today synthetic fibers have overtaken them as main materials for sewing threads and, for example, polyester materials are considered extremely important materials for sewing threads.

On the other hand, types of sewing machines include domestic sewing machines, professional sewing machines, and industrial sewing machines, each associated with markedly different stitching speeds. While the stitching speeds of domestic sewing machines are 500 to 900 stitches/min and those of professional sewing machines are generally 1,500 stitches/min or so, industrial sewing machines can achieve high stitching speeds of 5,500 stitches/min in the case of lockstitch sewing machines and 10,000 stitches/min in the case of overlock sewing machines, for example.

Sewing threads receive mechanical actions of wide-ranging speeds from low to high at various parts of the sewing machine including the stitching needle, while they are also exposed to a high-temperature environment as the temperature of the stitching needle rises due to frictional heat generated between the stitching needle and the fabric being sewn. Under this condition, sewing thread treatment agents, also referred to as sewing thread oil agents, play an important role; in particular, improvements in the techniques relating to sewing thread treatment agents (refer to Patent Literatures 1 to 3, etc., for example) have provided a background for the widespread use of synthetic-fiber sewing threads and these techniques are now essential to the processing of synthetic-fiber sewing threads.

BACKGROUND ART LITERATURE

Patent Literature

Patent Literature 1: Japanese Patent Laid-open No. Hei 02-307980
Patent Literature 2: Japanese Patent Laid-open No. Hei 08-302573
Patent Literature 3: Japanese Patent Laid-open No. 2017-110312

SUMMARY OF THE INVENTION

Problems to be Solved by the Invention

While various sewing thread treatment agents have been proposed, no sewing thread treatment agent has yet been reported that demonstrates satisfactory low friction properties across a wide range of speeds from low to high.

Accordingly, an object of the present invention is to provide a sewing thread treatment agent, and a sewing thread, each achieving low friction properties across a wide range of speeds.

Means for Solving the Problems

As a result of conducting numerous studies in earnest to achieve the aforementioned object, the inventor of the present invention found that a silicone having a specific chemical structure plays a significant role in bringing out low friction properties across a wide range of speeds, and eventually achieved the aforementioned object.

To be specific, key points of the present invention are as follows:

1. A sewing thread treatment agent characterized in that it contains a hydroxy-terminated polydimethylsiloxane (A), a nonionic surfactant (B), and at least one type of wax (C) selected from paraffin wax, oxidized paraffin wax, polyethylene wax, oxidized polyethylene wax, and carnauba wax.
2. The sewing thread treatment agent according to 1, wherein the nonionic surfactant (B) contains a (poly)oxyalkylene branched alkyl ether (B1) obtained by adding an alkylene oxide having 2 to 4 carbon atoms to a hydroxy compound having a branched chain in its molecule, at a ratio of 1 to 30 mols per 1 mol of the compound.
3. The sewing thread treatment agent according to 1 or 2, wherein the hydroxy-terminated polydimethylsiloxane (A) has a mass-averaged molecular weight of 10,000 to 500,000.
4. A sewing thread characterized in that the sewing thread treatment agent according to any one of 1 to 3 is adhered to it.

Effects of the Invention

The sewing thread treatment agent proposed by the present invention, and sewing thread to which this sewing thread treatment agent is adhered, will demonstrate low friction properties across a wide range of speeds, that is, regardless of whether a domestic sewing machine, professional sewing machine, or industrial sewing machine is used, and also regardless of which type of stitching, such as straight stitching or button-hole stitching, is performed. Their specific effects are to keep friction low at low, medium, and high stitching speeds and to reduce the friction difference between low speeds and high speeds, in particular.

Furthermore, the sewing thread treatment agent proposed by the present invention demonstrates excellent adhesion to sewing threads, which means that the sewing thread treatment agent will not seep out and make oil stains on the sewn fabric, and consequently beautiful sewn products can be obtained.

MODE FOR CARRYING OUT THE INVENTION

The present invention relates to a sewing thread treatment agent containing a hydroxy-terminated polydimethylsiloxane (A), a nonionic surfactant (B), and a wax (C), as well as a sewing thread to which this sewing thread treatment agent is adhered.

The present invention is explained in detail below.
<Hydroxy-Terminated Polydimethylsiloxane (A)>
The sewing thread treatment agent proposed by the present invention contains a hydroxy-terminated polydimethylsiloxane (A) as an essential component. This hydroxy-terminated polydimethylsiloxane (A) allows the sewing thread treatment agent proposed by the present invention to demonstrate low friction properties across a wide range of speeds.

The hydroxy-terminated polydimethylsiloxane (A) under the present invention represents a compound having at least one, or preferably two or more, hydroxy group(s) at the terminal of the main chain and/or side chain of its molecule. Such hydroxy-terminated polydimethylsiloxane (A) may be manufactured by hydrolyzing and condensing dimethyl dialkoxysilane or dimethyl dichlorosilane.

For the hydroxy-terminated polydimethylsiloxane (A) used in the sewing thread treatment agent proposed by the present invention, a commercially available polydimethylsiloxane containing silanol groups at both terminals, such as XC96-723, YF-3057, YF-3800, YF-3802, YF-3807, YF-3897, or YF-3905 (all product names) manufactured by Momentive Performance Materials Japan LLC, may be used. Furthermore, a hydroxy-terminated polydimethylsiloxane produced by emulsifying with an emulsifier, and then condensation-polymerizing, any of the aforementioned commercially available polydimethylsiloxanes containing silanol groups at both terminals, may be used. Also, the aforementioned hydroxy-terminated polydimethylsiloxane may be one having a star type, comb-shaped, or other branching structure.

The hydroxy-terminated polydimethylsiloxane (A) used under the present invention is one whose polystyrene-equivalent mass-averaged molecular weight measured by gel permeation chromatography is preferably in a range of 10,000 to 500,000, or more preferably in a range of 10,000 to 300,000, or most preferably in a range of 10,000 to 250,000. When a hydroxy-terminated polydimethylsiloxane (A) whose mass-averaged molecular weight in these ranges is used, the effects of keeping friction low at low, medium, and high stitching speeds and reducing the friction difference between low speeds and high speeds, in particular, are obtained, which is desired. Under the present invention, one type of hydroxy-terminated polydimethylsiloxane may be used alone, or two or more types having different mass-averaged molecular weights may be combined.

The sewing thread treatment agent proposed by the present invention contains the hydroxy-terminated polydimethylsiloxane (A) by preferably 5% by mass or more, or more preferably 10% by mass or more, or most preferably 15% by mass or more. Also, the upper limit of the content of the hydroxy-terminated polydimethylsiloxane (A) is preferably 95% by mass or lower, or more preferably 90% by mass or lower, or most preferably 85% by mass or lower.

Also, the sewing thread treatment agent proposed by the present invention may contain a silicone (a) other than the hydroxy-terminated polydimethylsiloxane (A). This silicone (a) may be any of straight silicones such as dimethylpolysiloxane, or modified silicones to which organic groups have been introduced, among which dimethylpolysiloxane or amino-modified silicone is preferred. The silicone (a) is preferably one whose polystyrene-equivalent mass-averaged molecular weight measured by gel permeation chromatography is in a range of 10,000 to 500,000, and one type of such silicone may be used alone or two or more types may be combined.

<Nonionic Surfactant (B)>

The sewing thread treatment agent proposed by the present invention contains a nonionic surfactant (B) as an essential component. This nonionic surfactant (B) is used as an emulsification dispersant that stably emulsifies hydrophobic components, such as the hydroxy-terminated polydimethylsiloxane (A) and wax (C) that are essential components of the present invention, in water.

The nonionic surfactant (B) may be, for example, a (poly)oxyalkylene alkyl ether, (poly)oxyalkylene alkyl phenyl ether, (poly)oxyalkylene allyl phenyl ether, (poly)oxyalkylene styryl phenyl ether, (poly)oxyalkylene alkyl phenyl ether formaldehyde condensate, (poly)oxyethylene-(poly)oxypropylene block polymer, (poly)oxyethylene-(poly)oxypropylene random polymer, (poly)oxyethylene-(poly)oxypropylene block polymer alkyl phenyl ether, sorbitan fatty acid ester, (poly)oxyalkylene fatty acid ester, (poly)oxyalkylene sorbitan fatty acid ester, (poly)oxyalkylene hardened castor oil, (poly)alkylene glycol fatty acid ester, (poly)alkylene glycol fatty acid ether, etc. Of these, any one type may be used alone, or two or more types may be combined.

For the nonionic surfactant (B) to be compounded into the sewing thread treatment agent proposed by the present invention, a (poly)oxyalkylene alkyl ether is preferred, and a (poly)oxyalkylene branched alkyl ether (B1) is more preferred. The (poly)oxyalkylene branched alkyl ether (B1) is preferably a (poly)oxyalkylene branched alkyl ether obtained by adding an alkylene oxide having 2 to 4 carbon atoms to a hydroxy compound having a branched chain in its molecule, at a ratio of 1 to 30 mols per 1 mol of the compound, where the branched chain is preferably an alkyl chain having 6 to 20 carbon atoms. One type of (poly)oxyalkylene alkyl ether may be used alone, or two or more types may be combined. Among them, using a (poly)oxyalkylene branched alkyl ether (B1) in combination with a (poly)oxyalkylene straight-chain alkyl ether (B2) is preferred.

The sewing thread treatment agent proposed by the present invention contains the nonionic surfactant (B) by preferably 5% by mass or more, or more preferably 8 percent by mass or more, or most preferably 12% by mass or more. Also, the upper limit of the content of the nonionic surfactant (B) is preferably 50% by mass or lower, or more preferably 40% by mass or lower, or most preferably 35% by mass or lower.

If the sewing thread treatment agent proposed by the present invention contains a (poly)oxyalkylene branched alkyl ether as the nonionic surfactant (B), the content percentage of the (poly)oxyalkylene branched alkyl ether (B1) in the total nonionic surfactant (B) is preferably 10% by mass or higher, or more preferably 20% by mass or higher, or most preferably 30% by mass or higher.

<Wax (C)>

The sewing thread treatment agent proposed by the present invention contains at least one type of wax (C) selected from paraffin wax, oxidized paraffin wax, polyethylene wax, oxidized polyethylene wax, and carnauba wax, as an essential component. These waxes are used to achieve good extreme-pressure lubricated friction on the sewing thread. Of these, one type may be used alone, or two or more types may be combined.

The sewing thread treatment agent proposed by the present invention contains the aforementioned wax by preferably 1% by mass or more, or more preferably 2% by mass or more, or most preferably 5% by mass or more. Also, the upper limit of the content of the aforementioned wax is preferably 90% by mass or lower, or more preferably 80% by mass or lower, or most preferably 70% by mass or lower.

<Paraffin Wax>

In the case of a paraffin wax, its melting point is preferably 40° C. or higher, or more preferably in a range of 40 to 90° C., or most preferably in a range of 45 to 80° C. If the melting point is under 40° C., the stitching property of the sewing thread that has been treated with the sewing thread treatment agent may be diminished. Also, the fogging property may worsen. If the melting point exceeds 90° C., on the other hand, the emulsifying property of the sewing thread treatment agent when emulsifying and dispersing it in water will worsen, and so will the stability of a diluted solution of the sewing thread treatment agent, and consequently even adhesion of the sewing thread treatment agent to the sewing thread may be inhibited.

The paraffin wax, which is a saturated hydrocarbon, may be of straight-chain type or branched, but preferably it is a normal paraffin wax ($C_nH_{2n+2}$) being a straight-chain saturated hydrocarbon. The number of carbon atoms of the paraffin wax is preferably 24 to 36, or more preferably 25 to 34, or yet more preferably 26 to 32. If the number of carbon atoms is under 24, the stitching property of the sewing thread that has been treated with the sewing thread treatment agent may drop. If the number of carbon atoms exceeds 36, on the other hand, the emulsifying property of the sewing thread treatment agent and stability of a diluted solution thereof may worsen, and consequently even adhesion of the sewing thread treatment agent to the sewing thread may be inhibited.

The molecular weight of the paraffin wax is preferably 340 to 500, or more preferably 350 to 480, or yet more preferably 360 to 450. If the molecular weight is under 340, the stitching property of the sewing thread that has been treated with the sewing thread treatment agent may drop. If the molecular weight exceeds 500, on the other hand, the emulsifying property of the sewing thread treatment agent and stability of a diluted solution thereof may worsen, and consequently even adhesion of the sewing thread treatment agent to the sewing thread may be inhibited.

One type of paraffin wax may be used alone, or two or more types may be combined, or a normal paraffin wax may be used as the primary component (95% by mass or more, or preferably 97% by mass or more, or yet more preferably 99% by mass or more) with a side-chain saturated hydrocarbon (isoparaffin) also contained by a small quantity.

<Oxidized Paraffin Wax>

In the case of an oxidized paraffin wax, its melting point is preferably 60° C. or higher, or more preferably in a range of 60 to 90° C., or yet more preferably in a range of 65 to 85° C., or most preferably in a range of 70 to 80° C. If the melting point is under 60° C., the stitching property of the sewing thread that has been treated with the sewing thread treatment agent may be diminished. Also, the fogging property may worsen. If the melting point exceeds 90° C., on the other hand, the emulsifying property and stability of the sewing thread treatment agent will worsen, and consequently even adhesion of the sewing thread treatment agent to the sewing thread may be inhibited.

The oxidized paraffin wax, which is an oxide obtained by oxidizing the aforementioned paraffin wax with oxygen or oxygen-containing air, contains hydroxyl groups, carboxyl groups, carbonyl groups, etc., on the structure of the paraffin wax. The acid value of the oxidized paraffin wax is preferably 6 to 19, or more preferably 8 to 17, or yet more preferably 10 to 16, from the viewpoint of improving the emulsifying property and stability of the sewing thread treatment agent, and thereby causing the sewing thread treatment agent to adhere evenly to the sewing thread.

The number of carbon atoms of the oxidized paraffin wax is preferably 24 to 36, or more preferably 25 to 34, or yet more preferably 26 to 32. If the number of carbon atoms is under 24, the stitching property of the sewing thread that has been treated with the sewing thread treatment agent may drop. If the number of carbon atoms exceeds 36, on the other hand, the emulsifying property of the sewing thread treatment agent and stability of a diluted solution thereof may drop, and consequently even adhesion of the sewing thread treatment agent to the sewing thread may be inhibited.

The molecular weight of the oxidized paraffin wax is preferably 340 to 500, or more preferably 350 to 480, or yet more preferably 360 to 450. If the molecular weight is under 340, the stitching property of the sewing thread that has been treated with the sewing thread treatment agent may drop. If the molecular weight exceeds 500, on the other hand, the emulsifying property of the sewing thread treatment agent and stability of a diluted solution thereof may worsen, and consequently even adhesion of the sewing thread treatment agent to the sewing thread may be inhibited.

One type of oxidized paraffin wax may be used alone, or two or more types may be combined.

<Polyethylene Wax>

In the case of a polyethylene wax, its melting point is preferably 100° C. or higher, or more preferably 100 to 150° C. If the melting point is under 100° C., the stitching property of the sewing thread that has been treated with the sewing thread treatment agent may be diminished. Also, the fogging property may worsen. If the melting point exceeds 150° C., on the other hand, the emulsifying property of the sewing thread treatment agent and stability of a diluted solution thereof will worsen, and consequently even adhesion of the sewing thread treatment agent to the sewing thread may be inhibited.

The molecular weight of the polyethylene wax used under the present invention is preferably 2,000 to 5,000, or more preferably 2,500 to 4,500, or yet more preferably 3,000 to 4,000. If the molecular weight is under 2,000, the stitching property of the sewing thread that has been treated with the sewing thread treatment agent may be diminished. If the molecular weight exceeds 5,000, on the other hand, the emulsifying property of the sewing thread treatment agent and stability of a diluted solution thereof may worsen, and consequently even adhesion of the sewing thread treatment agent to the sewing thread may be inhibited.

Also, one type of polyethylene wax may be used alone, or two or more types may be combined.

<Oxidized Polyethylene Wax>

In the case of an oxidized polyethylene wax, its melting point is preferably 100° C. or higher, or more preferably 100 to 180° C., or yet more preferably 120 to 160° C. If the melting point is under 100° C., the stitching property of the sewing thread that has been treated with the sewing thread treatment agent may be diminished. Also, the fogging property may worsen. If the melting point exceeds 180° C., on the other hand, the emulsifying property of the sewing thread treatment agent and stability of a diluted solution thereof will worsen, and consequently even adhesion of the sewing thread treatment agent to the sewing thread may be inhibited.

The oxidized polyethylene wax, which is an oxide obtained by oxidizing the aforementioned polyethylene wax with oxygen or oxygen-containing air, contains hydroxyl groups, carboxyl groups, carbonyl groups, etc., on the structure of the polyethylene wax. The acid value of the oxidized polyethylene wax is preferably 3 to 100, or more preferably 5 to 50, or yet more preferably 7 to 30, from the viewpoint of improving the emulsifying property of the sewing thread treatment agent and stability of a diluted solution thereof, and thereby causing the sewing thread treatment agent to adhere evenly to the sewing thread.

The molecular weight of the oxidized polyethylene wax is preferably 2,200 to 5,200, or more preferably 2,700 to 4,700, or yet more preferably 3,200 to 4,200. If the molecular weight is under 2,200, the stitching property of the sewing thread that has been treated with the sewing thread treatment agent may be diminished. If the molecular weight exceeds 5,200, on the other hand, the emulsifying property of the sewing thread treatment agent and stability of a diluted solution thereof may worsen, and consequently even adhesion of the sewing thread treatment agent to the sewing thread may be inhibited.

Also, one type of oxidized polyethylene wax may be used alone, or two or more types may be combined.

<Carnauba Wax>

A carnauba wax is a naturally derived wax made from refined carnauba wax collected from palm trees of the Arecaceae family, and is constituted by 80 to 85 parts by mass of wax ester, 3 to 4 parts by mass of free fatty acid, 10 to 12 parts by mass of free alcohol, and 1 to 3 parts by mass of hydrocarbon.

In the case of a carnauba wax, its melting point is preferably 60° C. or higher, or more preferably 60 to 120° C., or yet more preferably 70 to 110° C. If the melting point is under 60° C., the stitching property of the sewing thread that has been treated with the sewing thread treatment agent may be diminished. Also, the fogging property may worsen. If the melting point exceeds 120° C., on the other hand, the emulsifying property of the sewing thread treatment agent and stability of a diluted solution thereof will worsen, and consequently even adhesion of the sewing thread treatment agent to the sewing thread may be inhibited.

Also, one type of carnauba wax may be used alone, or two or more types may be combined.

<Other Component (D)>

The sewing thread treatment agent proposed by the present invention may further contain an anionic surfactant. The types of anionic surfactants that can be compounded are not limited, and include, for example: salt of octyl phosphoric acid ester, salt of isooctyl phosphoric acid ester, salt of decyl phosphoric acid ester, salt of dodecyl phosphoric acid ester, salt of tridecyl phosphoric acid ester, salt of tetradecyl phosphoric acid ester, salt of 2-ethylhexyl phosphoric acid ester, salt of isotridecyl phosphoric acid ester, salt of isohexadecyl phosphoric acid ester, salt of polyoxyethylene octyl ether phosphoric acid ester, salt of polyoxyethylene isooctyl ether phosphoric acid ester, salt of polyoxyethylene-2-ethylhexyl ether phosphoric acid ester, salt of polyoxyethylene decyl ether phosphoric acid ester, salt of polyoxyethylene dodecyl ether phosphoric acid ester, salt of polyoxyethylene tridecyl ether phosphoric acid ester, salt of polyoxyethylene tetradecyl ether phosphoric acid ester, salt of polyoxyethylene hexadecyl ether phosphoric acid ester, and other anionic surfactants of the "salt of phosphoric acid ester" type; salt of octyl sulfonic acid, salt of decyl sulfonic acid, salt of dodecyl sulfonic acid, salt of tetradecyl sulfonic acid, salt of hexadecyl sulfonic acid, salt of octyl benzene sulfonic acid, salt of dodecyl benzene sulfonic acid, and other anionic surfactants of the "salt of sulfonic acid" type; salt of octyl sulfate, salt of decyl sulfate, salt of dodecyl sulfate, salt of tetradecyl sulfate, salt of hexadecyl sulfate, and other anionic surfactants of the "salt of sulfuric acid ester" type; salt of octanoic acid, salt of capric acid, salt of lauric acid, salt of oleic acid, and other anionic surfactants of the "salt of fatty acid" type, etc. Among these, an anionic surfactant constituted by a sodium salt, potassium salt or other alkali metal salt is preferred. One type of anionic surfactant may be used alone, or two or more types may be combined.

The sewing thread treatment agent proposed by the present invention may combine other components, such as defoaming agent, antioxidant, preservative, rustproof agent, etc. Preferably the quantities of other components to be combined, which may be specified to the extent that the effects of the present invention are not diminished, are kept as small as possible.

<Method for Preparing Sewing Thread Treatment Agent>

The method for preparing the sewing thread treatment agent proposed by the present invention is not limited in any way, and any known method may be adopted. For example, it may be obtained by mixing the hydroxy-terminated polydimethylsiloxane (A), nonionic surfactant (B) and wax (C) with water, and if necessary, an anionic surfactant and other components, etc., and then emulsifying the mixture using a general agitation device and an emulsification machine such as homo mixer, homogenizer, colloid mill, line mixer, etc.

<Sewing Thread>

The sewing thread proposed by the present invention comprises a synthetic-fiber or natural-fiber sewing thread to which the sewing thread treatment agent proposed by the present invention is adhered. The purpose of use of the sewing thread proposed by the present invention is not limited in any way, and it can be used with all sewing machines including domestic sewing machines, professional sewing machines, and industrial sewing machines. Because the sewing thread proposed by the present invention demonstrates the effects of keeping friction low at low, medium, and high stitching speeds and reducing the friction difference between low speeds and high speeds, in particular, it can be suitably used in industrial applications for all types of stitching such as straight stitching and button-hole stitching.

The synthetic-fiber sewing thread (untreated sewing thread) may be made of polyamide fibers, polyester fibers, cationic dyeable polyester fibers, polyvinyl fibers, polyacrylic alcohol fibers, polyurethane fibers, acrylic fibers, polyethylene fibers, polyvinylidene fibers, polystyrene fibers, or other synthetic fibers. Among these, polyester fibers and polyamide fibers are particularly preferred. Polyester fibers may be based on polyethylene terephthalate, polybutylene terephthalate, polyethylene naphthalate, polytrimethylene terephthalate, etc., of which polyethylene terephthalate is preferred. For the aforementioned synthetic-fiber sewing thread, either a filament thread or spun thread may be used.

The natural-fiber sewing thread (untreated sewing thread) may be made of cotton, silk, hemp, or other natural fibers. Also, a cored cotton thread having a polyester thread core and a cotton thread finish, or a mop thread which is a special twisted thread made of a cotton material or synthetic material, may also be used as the untreated sewing thread under the present invention.

Sewing threads are generally available in the form of cheese or skein, and the sewing thread treatment agent proposed by the present invention is typically applied to a sewing thread in either form, which is then wound into a cone shape for processing. Methods for applying the sewing thread treatment agent proposed by the present invention include the oiling-roller feeding method, guide-nozzle feeding method, immersion feeding method, etc., and any of these methods may be used. The sewing thread treatment agent proposed by the present invention may be diluted in water according to the equipment to be used, before application.

The adhesion quantity of the nonvolatile content of the sewing thread treatment agent is preferably in a range of 1.5 to 7.5% by weight, or more preferably in a range of 2 to 7% by weight, or yet more preferably in a range of 2 to 6% by weight, relative to the untreated sewing thread. If the adhesion quantity is under 1.5% by weight, the smoothness may drop. If the adhesion quantity exceeds 7.5% by weight, the evenness of adhesion may drop or problems such as oil stains may occur. It should be noted that the adhesion quantity of the nonvolatile content of the sewing thread treatment agent can be measured based on normal hexane-extractable content using a Soxhlet extractor.

EXAMPLES

The present invention is explained below using examples; however, the technical scope of the present invention is not limited by these examples. It should be noted that, in the Examples and Comparative Examples below, "part" refers to "part by mass," while "percent" refers to "percent by mass."

<Preparation of Sewing Thread Treatment Agent>

Example 1

Seventy-five parts of a hydroxy-terminated polydimethylsiloxane (A-1), 7 parts of a (poly)oxyalkylene branched alkyl ether (B1-1), 5 parts of a (poly)oxyalkylene branched alkyl ether (B1-2), 3 parts of a (poly)oxyalkylene straight-chain alkyl ether (B2-1), and 10 parts of a wax (C-1) that has been heated to the melting point or above and thus dissolved, were added to a beaker and mixed well, after which 150 parts of ion-exchanged water were added gradually to the mixture, to prepare the 40-percent emulsion in Example 1.

Examples 2 to 10 and Comparative Examples 1 to 4

The sewing thread treatment agents in Examples 2 to 10 and Comparative Examples 1 to 3 were prepared in the same manner as specified by the preparation method in Example 1 above, according to the formulations shown in Table 1 below. Comparative Example 4 represents an example where no treatment agent was fed.

The formulations of the sewing thread treatment agents in Examples 1 to 10 and Comparative Examples 1 to 4 are summarized in Table 1 below.

TABLE 1

| | Silicone | | | | Nonionic surfactant (B) | | | | | | | |
| --- | --- | --- | --- | --- | --- | --- | --- | --- | --- | --- | --- | --- |
| | Hydroxy-terminated polydimethylsiloxane (A) | | Silicone (a) other than (A) | | (Poly)oxyalkylene branched alkyl ether (B1) | | (Poly)oxyalkylene straight-chain alkyl ether (B2) | | Wax (C) | | Other components (D) | |
| | Type | Ratio (percent by mass) | Type | Ratio (percent by mass) | Type | Ratio (percent by mass) | Type | Ratio (percent by mass) | Type | Ratio (percent by mass) | Type | Ratio (percent by mass) |
| Example 1 | A-1 | 75 | — | | B1-1 | 7 | B2-1 | 3 | C-1 | 10 | — | |
| | | | | | B1-2 | 5 | | | | | | |
| Example 2 | A-2 | 30 | — | | B1-3 | 5 | B2-2 | 8 | C-2 | 50 | D-1 | 2 |
| | | | | | B1-4 | 5 | | | | | | |
| Example 3 | A-3 | 15 | — | | B1-2 | 4 | B2-3 | 14 | C-3 | 60 | D-2 | 1 |
| | | | | | B1-4 | 6 | | | | | | |
| Example 4 | A-3 | 30 | — | | B1-1 | 8 | B2-4 | 3 | C-4 | 10 | D-3 | 1 |
| | A-4 | 40 | | | B1-4 | 8 | | | | | | |
| Example 5 | A-1 | 50 | — | | B1-4 | 5 | B2-1 | 3 | C-5 | 20 | — | |
| | | | | | B1-5 | 17 | B2-2 | 5 | | | | |
| Example 6 | A-2 | 80 | — | | B1-1 | 3 | B2-3 | 2 | C-6 | 5 | — | |
| | | | | | B1-2 | 5 | | | | | | |
| | | | | | B1-5 | 5 | | | | | | |
| Example 7 | A-3 | 55 | a-3 | 5 | B1-1 | 8 | B2-4 | 6 | C-7 | 20 | D-1 | 1 |
| | | | | | B1-2 | 4 | | | | | D-2 | 1 |
| Example 8 | A-4 | 68 | a-1 | 10 | B1-3 | 8 | B2-3 | 4 | C-6 | 10 | — | |
| Example 9 | A-5 | 65 | — | | B1-1 | 8 | B2-1 | 4 | C-7 | 20 | D-3 | 1 |
| | | | | | B1-3 | 2 | | | | | | |
| Example 10 | A-6 | 75 | — | | — | | B2-1 | 5 | C-2 | 10 | — | |
| | | | | | | | B2-2 | 5 | | | | |
| | | | | | | | B2-3 | 5 | | | | |
| Comparative Example 1 | — | | a-2 | 75 | — | | B2-1 | 5 | C-1 | 10 | — | |
| | | | | | | | B2-2 | 5 | | | | |
| | | | | | | | B2-3 | 5 | | | | |
| Comparative Example 2 | A-1 | 75 | — | | — | | B2-1 | 10 | — | | — | |
| | | | | | | | B2-2 | 10 | | | | |
| | | | | | | | B2-3 | 5 | | | | |
| Comparative Example 3 | — | | a-1 | 75 | B1-1 | 7 | B2-1 | 3 | C-1 | 10 | — | |
| | | | | | B1-2 | 5 | | | | | | |
| Comparative Example 4 | — | | — | | — | | — | | — | | — | |

The ratios (percent) in Table 1 are values expressing the compounding percentages of the respective components in ratio by mass (percent) based on the total sewing thread treatment agent representing 100 parts by mass.

The respective symbols in Table 1 represent the components specified below.

<Hydroxy-terminated Polydimethylsiloxane (A)>
A-1: Hydroxy-terminated polydimethylsiloxane (Mass-averaged molecular weight 100,000)
A-2: Hydroxy-terminated polydimethylsiloxane (Mass-averaged molecular weight 150,000)
A-3: Hydroxy-terminated polydimethylsiloxane (Mass-averaged molecular weight 250,000)
A-4: Hydroxy-terminated polydimethylsiloxane (Mass-averaged molecular weight 12,000)
A-5: Hydroxy-terminated polydimethylsiloxane (Mass-averaged molecular weight 50,000)
A-6: Hydroxy-terminated polydimethylsiloxane (Mass-averaged molecular weight 400,000)

<Silicone (a) Other than (A)>
a-1: Polydimethylsiloxane (Mass-averaged molecular weight 100,000)
a-2: Polydimethylsiloxane (Mass-averaged molecular weight 10,000)
a-3: Polydimethylsiloxane (Mass-averaged molecular weight 50,000)

<Nonionic Surfactant (B)>
(B1): (Poly)Oxyalkylene Branched Alkyl Ether
B1-1: Ethylene oxide 5-mol adduct of 2-ethyl-1-hexanol
B1-2: Ethylene oxide 10-mol adduct of 2-butyl-1-octanol
B1-3: Ethylene oxide 2-mol, propylene oxide 6-mol adduct of 2-butyl-1-decanol
B1-4: Ethylene oxide 4-mol, propylene oxide 4-mol adduct of 2-octyl-1-decanol
B1-5: Ethylene oxide 8-mol, propylene oxide 6-mol adduct of 2,6-dimethyl-4-heptanol (B2): (Poly)Oxyalkylene Straight-Chain Alkyl Ether
B2-1: Ethylene oxide 3-mol adduct of octadecyl alcohol
B2-2: Ethylene oxide 7-mol adduct of dodecyl alcohol
B2-3: Ethylene oxide 10-mol adduct of octyl alcohol
B2-4: Ethylene oxide 18-mol adduct of octadecenyl alcohol <Wax (C)>
C-1: Paraffin wax (Melting point 66° C.)
C-2: Paraffin wax (Melting point 54° C.)
C-3: Paraffin wax (Melting point 50° C.)
C-4: Oxidized paraffin wax (Melting point 75° C.)
C-5: Polyethylene wax (Melting point 110° C.)
C-6: Oxidized polyethylene wax (Melting point 135° C.)
C-7: Carnauba wax (Melting point 90° C.)

<Other Components>
D-1: Potassium salt of polyethylene (5-mol) lauryl phosphoric acid ester
D-2: Sodium salt of alkyl (12 to 15 carbon atoms) sulfonate
D-3: Potassium salt of oleic acid <Evaluation Test>
A sewing thread was unreeled and then sandwiched between two types of abrasion bodies having polished chrome mirror surface on which a load of 500 grams was applied, after which the sewing thread was passed through a tensiometer and then reeled at each of the constant speeds specified below, to take the average value of tension over 1 minute as the measured value. For the speed difference of tension, the value of "Low-speed tension–High-speed tension" was used as the measured value.

<Low-speed Tension: 1 m/min>
[Evaluation Criteria]
⊚: Under 200 g
○: 200 g or higher but under 230 g
Δ: 230 g or higher but under 300 g
x: 300 g or higher <Medium-speed Tension: 5 m/min>
[Evaluation Criteria]
⊚: Under 200 g
○: 200 g or higher but under 230 g
Δ: 230 g or higher but under 300 g
X: 300 g or higher <High-Speed Tension: 50 m/Min>
[Evaluation Criteria]
⊚: Under 200 g
○: 200 g or higher but under 230 g
Δ: 230 g or higher but under 300 g
x: 300 g or higher <Speed Difference of Tension: Low-Speed Tension–High-Speed Tension>
[Evaluation Criteria]
⊚: Less than 20 g
○: 20 g or more but less than 30 g
Δ: 30 g or more but less than 50 g
x: 50 g or more <Oil Stains>
A sewing thread to which each treatment agent had been applied was sewn into a fabric, which was let stand for 1 week and then visually evaluated for oil stains.
[Evaluation Criteria]
○: There were no oil stains.
x: There were oil stains.

TABLE 2

| Category | Evaluation | | | | |
| --- | --- | --- | --- | --- | --- |
| | Low-speed tension | Medium-speed tension | High-speed tension | Speed difference of tension | Oil stains |
| Example 1 | ⊚ | ⊚ | ⊚ | ⊚ | ○ |
| Example 2 | ⊚ | ⊚ | ⊚ | ⊚ | ○ |
| Example 3 | ⊚ | ⊚ | ⊚ | ⊚ | ○ |
| Example 4 | ⊚ | ⊚ | ⊚ | ⊚ | ○ |
| Example 5 | ⊚ | ⊚ | ⊚ | ⊚ | ○ |
| Example 6 | ⊚ | ⊚ | ⊚ | ⊚ | ○ |
| Example 7 | ⊚ | ⊚ | ⊚ | ⊚ | ○ |
| Example 8 | ⊚ | ⊚ | ⊚ | ⊚ | ○ |
| Example 9 | ⊚ | ⊚ | ⊚ | ⊚ | ○ |
| Example 10 | ⊚ | ⊚ | ○ | ○ | ○ |
| Comparative Example 1 | Δ | ○ | ⊚ | X | X |
| Comparative Example 2 | X | Δ | ⊚ | X | ○ |
| Comparative Example 3 | Δ | ○ | ⊚ | X | X |
| Comparative Example 4 | X | X | X | X | ○ |

As shown in Table 2, the treatment agents in Examples 1 to 10 representing specific examples of the sewing thread treatment agent proposed by the present invention clearly reduced friction under low-speed tension, medium-speed tension, and high-speed tension, and furthermore reduced friction difference between low speed and high speed. In particular, the treatment agents in Examples 1 to 9 containing a (poly)oxyalkylene branched alkyl ether (B1) as a nonionic surfactant (B) led to extremely low friction under high-speed tension, as well as a very small friction difference between low speed and high speed.

In contrast, the treatment agents in Comparative Examples 1 to 3 not containing either a hydroxy-terminated polydimethylsiloxane (A) or wax (C), each being an essential component of the present invention, resulted in high friction under low-speed tension and medium-speed tension and consequently created a very large friction difference between low speed and high speed, clearly indicating that stable stitching could not be achieved at a wide range of speeds. Furthermore, the treatment agents in Comparative Examples 1 and 3 not containing a hydroxy-terminated polydimethylsiloxane (A) being an essential component of the present invention had poor adhesion to the sewing thread and thus seeped out into the stitched fabric and made oil stains.

INDUSTRIAL FIELD OF APPLICATION

The sewing thread treatment agent proposed by the present invention, and sewing thread to which this sewing thread treatment agent is adhered, demonstrates low friction properties across a wide range of speeds, that is, regardless of whether a domestic sewing machine, professional sewing machine, or industrial sewing machine is used, and also regardless of which type of stitching, such as straight stitching or button-hole stitching, is performed. Their specific effects are to keep friction low at low, medium, and high stitching speeds and to reduce the friction difference between low speeds and high speeds, in particular, which is useful.

Furthermore, the sewing thread treatment agent proposed by the present invention demonstrates excellent adhesion to sewing threads, which means that the sewing thread treatment agent will not seep out and make oil stains on the sewn fabric, and consequently, beautiful sewn products can be obtained, which is very beneficial.

What is claimed is:

1. A sewing thread treatment agent characterized by containing a hydroxy-terminated polydimethylsiloxane (A), a nonionic surfactant (B), and at least one wax (C) selected from paraffin wax, oxidized paraffin wax, polyethylene wax, oxidized polyethylene wax, and carnauba wax,
   wherein the nonionic surfactant (B) contains: a (poly) oxyalkylene branched alkyl ether (B1) obtained by adding an alkylene oxide having 2 to 4 carbon atoms to a hydroxy compound having a branched alkyl chain having 6 to 20 carbon atoms in its molecule, at a ratio of 1 to 30 mols per 1 mol of the hydroxy compound; and a (poly)oxyalkylene straight-chain alkyl ether (B2).

2. The sewing thread treatment agent according to claim 1, wherein the hydroxy-terminated polydimethylsiloxane (A) has a mass-averaged molecular weight of 10,000 to 500,000.

3. A sewing thread characterized in that the sewing thread treatment agent according to claim 1 is adhered to it.

4. A sewing thread characterized in that the sewing thread treatment agent according to claim 2 is adhered to it.

* * * * *